United States Patent [19]
Abrams

[11] 3,747,680
[45] July 24, 1973

[54] INCREASING INJECTIVITY BY DILUTE ALCOHOL INJECTION

[75] Inventor: Albert Abrams, Houston, Tex.

[73] Assignee: Shell Oil Co., New York, N.Y.

[22] Filed: July 9, 1971

[21] Appl. No.: 161,341

[52] U.S. Cl. .............................. 166/305 R, 166/273
[51] Int. Cl. ...................... E21b 43/22, E21b 43/24
[58] Field of Search ......................................................
    166/273–275, 305 R; 252/8.55 D, 8.55 B

[56] References Cited
UNITED STATES PATENTS

| | | | |
|---|---|---|---|
| 3,467,188 | 9/1969 | Gogarty | 166/275 X |
| 3,131,759 | 5/1964 | Slusser et al. | 166/305 R |
| 2,356,205 | 8/1944 | Blair, Jr. et al. | 166/305 R UX |
| 3,474,865 | 10/1969 | Gogarty et al. | 166/275 X |
| 3,288,215 | 11/1966 | Townsend et al. | 166/305 R |
| 3,664,419 | 5/1972 | Holm | 166/305 R X |
| 3,064,732 | 11/1962 | Bernard et al. | 166/305 R |
| 3,236,306 | 2/1966 | Atwood | 166/305 R |

OTHER PUBLICATIONS

"Handbook of Chemistry and Physics," 36th Ed., 1954–55, Chemical Rubber Publishing Co., Cleveland, Ohio, pp. 818, 819, 994 and 995.

*Primary Examiner*—Stephen J. Novosad
*Attorney*—H. W. Coryell et al.

[57] ABSTRACT

The effective permeability to water of a reservoir that contains residual oil near a well is improved by injecting a slug of an aqueous solution containing from about 6–20 percent of a normally liquid alcohol having a water solubility of from about 6–20 percent.

6 Claims, No Drawings

INCREASING INJECTIVITY BY DILUTE ALCOHOL INJECTION

BACKGROUND OF THE INVENTION

This invention relates to a well treatment process for improving the effective permeability to water, (e.g., regarding water-injectivity) in a reservoir in which such a permeability is restricted by the presence of residual oil in the region near the well.

Previously proposed treatments for displacing such a residual oil away from the near well region, and thus improving the injectivity, have included the use of chemical flooding surfactant systems such as those used for fluid drive oil recovery processes, concentrated or substantially pure alcohols that are mutually miscible with oil and water, etc. For example, U.S. Pat. No. 3,033,288 describes an oil recovery process in which oil is displaced by injecting a slug of brine and then a slug of an alcohol that is relatively soluble in oil and water but relatively insoluble in brine. U.S. Pat. No. 3,064,732 describes a water injectivity improvement process in which oil is displaced by injecting substantially pure methyl alcohol. Such previously proposed treatments tend to be relatively expensive due to the cost of the mutually miscible solvents and/or the tailoring of the surfactant systems and injection procedures to the particular characteristics of the reservoir formation.

SUMMARY OF THE INVENTION

In accordance with this invention, the effective permeability to water of a reservoir that contains residual oil near a well is improved by injecting a slug of a substantially surfactent-free aqueous saline solution containing from about 6–20 percent by volume of a normally liquid alcohol having a water solubility in said aqueous solution of from about 6–20 percent by volume through the well to displace residual oil away from the well.

The alcohol used may comprise one or more normally liquid alcohols of the specified water solubility. Such alcohols are preferably monohydric, aliphatic or alicyclic alcohols containing from about 3 to 6 carbon atoms. Illustrative examples of such alcohols include isopropyl alcohol, isobutyl alcohol, tertiary butyl alcohol, the pentanols, the aliphatic and alicyclic, hexanols and the like.

The aqueous liquid in which the alcohol is dissolved is preferably a fresh water or a relatively soft water. Examples include fresh water, aqueous solutions containing from about 1 to 10 percent by weight of a dissolved salt such as one or more alkali metal chlorides, bromides, sulfides, sulphates, nitrates, or the like. Aqueous liquids containing dissolved alkaline earth metal ions or anions such as sulphate anions which form insoluble salts with the alkaline earth metal ions can be used where they are compatible with the natural waters in the reservoir and/or aqeuous liquids previously injected into the reservoir.

The water solubility of the alcohol and the composition and concentration of the salt dissolved in the aqueous liquid in which the alcohol is dissolved are preferably correlated so that the less soluble alcohols are dissolved in the more dilute aqueous solutions of salts.

The amount of liquid (i.e., the slug of aqueous alcohol and, where desired, a subsequently injected slug of alcohol solution displacing fluid) injected in order to displace residual oil away from the well being treated is preferably inclusive of at least about one pore volume of the alcoholic solution relative to a cylindrical zone (co-extensive with the vertical interval of reservoir into which the well is opened) having a diameter of from about 5 to 10 feet. A preferred procedure utilizes at least about one pore volume of alcoholic solution relative to a zone within the reservoir having a diameter of about 5 feet followed by at least an equal volume of an alcohol solution displacing fluid, such as fresh water or the aqueous liquid in which the alcohol is dissolved, that is miscible and unreactive with respect to the alcohol solution.

In general, the aqueous alcohol should be injected at a rate that is relatively high but is one that can be attained in response to an injection pressure that is less than the fracturing pressure of the reservoir. A rate corresponding to a frontal advance of at least about 2 to 4 feet per day (along a given radial direction away from the point of injection) is generally suitable. Particularly good results have been attained by an injection rate corresponding to from about 50 to 60 feet per day.

TEST RESULTS

Short core apparatus and flow test techniques were used for all tests. Tests were conducted at 105° F with cores confined in a modified Hassler holder under a simulated overburden pressure of 250 psi. The floods were at constant rate. Pressure drop monitoring was continuous. Qualitative observations of the producing ratio of oil and water were made during the floods. Flashed Wasson crude oil and a Nujol-Soltrol mixture, both with viscosity of 7.3 cp, were used as oil phases. Solubility data were obtained by gas-liquid chromatography on isobutyl alcohol-water solutions equilibrated at 105° F. This technique was used also to determine alcohol solubility in the oil mixture but could not be used for the crude oil because of the interference from components of the oil.

It can be seen from the data presented in Table 1 that the addition of the alcohol increases the viscosities of the waters only slightly. The injection of these low viscosity treating agents could reduce the stability of the oil displacement stage but is compensated for by the ease which the treating agents can be displaced by the follow-up water.

Distribution coefficients for Wasson injection water, 2 percent NaCl solution and 10 percent NaCl solution were determined by analyses of the oil and water phases in the swelling tests. They were found to be, respectively, 1.78, 1.63 and 2.27 for the Nujol-Soltrol mixture. As mentioned earlier, we could not determine the amount of alcohol in the crude oil but from data for the water phases, we conclude that the distribution coefficients for the crude oil system are essentially the same as those for the oil mixture. These coefficients indicate that we are dealing with an alcohol-rich oil phase which means that the oil can readily extract alcohol from the injected alcohol-water solution.

Table 1 presents viscosity and solubility data and Tables 2, 3 and 4 present results of flow tests.

TABLE 1

VISCOSITY AND SOLUBILITY DATA FOR AQUEOUS SYSTEMS USED IN THIS STUDY

| System | Dissolved solids (ppm) | Viscosity (cp) | Solubility, percent by volume | |
|---|---|---|---|---|
| | | | Alcohol in water | Water in alcohol |
| Waters | | | | |
| Wasson injection | ~700 | 0.64 | | |
| 90% Wasson injection 10% Wasson produced | ~10,000 | 0.71 | | |
| 2% NaCl/distilled water | ~20,000 | 0.70 | | |
| 5% NaCl/distilled water | ~50,000 | 0.72 | | |
| 10% NaCl/distilled water | ~100,000 | 0.80 | | |
| Waters saturated with isobutyl alcohol | | | | |
| Wasson injection | ~700 | 0.84 | 8.9 | 17 |
| 90% Wasson injection 10% Wasson produced | ~10,000 | 0.85 | 8.0 | |
| 2% NaCl/distilled water | ~20,000 | 0.84 | 7.5 | 14 |
| 5% NaCl/distilled water | ~50,000 | 0.83 | 6.5 | |
| 10% NaCl/distilled water | ~100,000 | 0.90 | 4.6 | |
| Isobutyl alcohol | — | 2.12 | — | — |

Data are for 105°F.
Wasson injection-produced water mixture was not used in flow tests; data included to show effects of salinity on alcohol solubility in water.

tion data are based on volumetric measurements initiated with the water saturated core. Subsequent volumetric data are uncertain because of loss of control of oil volumes produced during the alcohol floods due to inadequate analytical procedures. We estimated $S_{orc}$ (oil saturation after chemical displacement) by measuring the amount of oil which could be injected into the core following an alcohol treatment. This was compared with initial oil and waterflood data to estimate the additional oil produced by the alcohol. By the same method we assured ourselves that the waterflood $S_{or}$ (residual oil saturation) value for a given core did not change significantly. We include $k_w$ (waterflood permeability in millidarcies) values at $S_{or}$ obtained by waterflood at 2–4 ft/day and at 50–60 ft/day.

Of considerable importance is the effect of rate on $k_w$ at $S_{or}$. Although the changes in saturation occurring during an increase in rate from 2–4 ft/day to 50–60 ft/day is of the order of 2–4 saturation percent, we

TABLE 2

RESULTS OF FLOW TESTS ON THE EFFECTIVENESS OF ISOBUTYL ALCOHOL AND WATER SOLUTIONS SATURATED WITH ISOBUTYL ALCOHOL IN INCREASING $k_w$ AT $S_{or}$ t = 105°F

| Core description* | Fluid systems | | | Permeability and saturation data | | | | | | | | | | |
|---|---|---|---|---|---|---|---|---|---|---|---|---|---|---|
| | | | | Waterflood tests | | | | | | Injectivity improvement tests | | | | |
| | Oil | Water | Injection | $k_o$ at $S_{or}$, md | $k_w$ at $S_{or}$, MD (2–4 ft/day) | $S_{or}$, % $V_p$ | $k_w$ at $S_{or}$, md (50–60 ft/day) | $S_{or}$, % $V_p$ | $S_{orc}^{**}$ % $V_p$ (50–60 ft/day) | $k'_{ROH}$, md | $k'_{w}$, md | $k_w/k_w$ (perm. improv. ratio) | $k/k_w$ (potential) | $k'_w/k$) × 100 (% effectiveness) |
| Indiana limestone cores | | | | | | | | | | | | | | |
| No. 4 k***=17.6 md φ=17.5% | Nujol-soltrol | Wasson inj. | ROH**** | 8.5 | 0.31 | 30 | 1.16 | 27 | <5 | 12.1 | 7.3 | 6.3–23.5 | 23.5–6.3 | 41 |
| | Nujol-soltrol | Wasson inj. | W+ROH | 8.8 | 0.32 | 30 | 1.16 | 27 | 18 | 3.1 | 3.6 | 3.1–11.3 | 11.3–3.1 | 20 |
| | Wasson crude | Wasson inj. | ROH | 12.1 | 0.97 | 25 | 3.2 | 23 | 10 | 10.6 | 6.6 | 2.1–6.8 | 6.8–2.1 | 38 |
| | Wasson crude | Wasson inj. | W+ROH | 12.0 | 0.91 | 25 | 2.2 | 23 | 19 | 3.3 | 4.2 | 1.9–4.6 | 4.6–1.9 | 24 |
| No. 6 k=86.5 md φ=17.2% | Wasson crude | Wasson inj. | ROH | 92.9 | 6.8 | 35 | 18.2 | 32 | <5 | 63.4 | 43.4 | 2.4–6.4 | 6.4–2.4 | 50 |
| | Wasson crude | Wasson inj. | W+ROH | 85.9 | 8.9 | 35 | 20.6 | 32 | 24 | 30.5 | 34.3 | 1.7–3.9 | 3.9–1.7 | 40 |
| No. 1L k=22.5 md φ=15.2% | Wasson crude | Wasson inj. | ROH | 21.6 | 1.18 | 30 | 4.0 | 28 | <5 | 13.4 | 16.7 | 4.2–14.2 | 14.2–4.2 | 74 |
| | Wasson crude | Wasson inj. | W+ROH | 17.6 | 1.37 | 30 | 4.5 | 28 | 18 | 6.1 | 6.5 | 1.4–4.7 | 4.7–1.4 | 29 |
| Wasson 1A Denver unit well 7504, 4996-97 ft Zone M-3 k=12.2 md φ=16.5% | Wasson crude | Wasson inj. | ROH | 12.7 | 1.5 | 30 | 3.6 | 28 | 15 | 15.4 | 13.6 | 3.8–9.1 | 9.1–3.8 | >100 |
| | Wasson crude | Wasson inj. | W+ROH | 12.7 | 1.5 | 30 | 3.6 | 28 | 25 | 4.4 | 4.7 | 1.4–3.1 | 3.1–1.4 | 39 |

*All cores except 1L are 1 in. diameter × 2 in. length. 1L is 1 in. diameter × 8.4 in. length.
**$S_{orc}$ is oil saturation left by treatment.
***k represents $k_w$ at $S_w$=100%; $k'_w$ is the water permeability following treatment.
****ROH represents alcohol, W represents water phase.

Since wettability can affect waterflood saturations and permeabilities, we checked the wettability of the cores tested in this study and found them to be water-wet. This conclusion is based on the production of oil by countercurrent imbibition of water at $S_{oi}$ and from interpretation of the permeability data at the end-point saturations.

Attention is directed to that part of Table 2 relating to waterflood tests in which end-point saturations and permeabilities are presented. The waterflood saturashow in Table 3 that the change in $k_w$ can be as much as threefold. These data were obtained by waterflooding at 2–4 ft/day and then increasing the injection rate stepwise to obtain the $k_w$ data presented. We have included data for the stepwise decrease in rate following measurements at the 50–60 ft/day level. If the changes in $k_w$ are due to displacement of oil from the core, we would anticipate that $k_w$ measured at the highest rate would be reproduced as rates are decreased. This appears to be essentially the case for Indiana lime-

TABLE 3

EFFECT OF FLOW RATE ON $k_w$ AT $S_{or}$

| Core | Fluid systems | | $k_w$, md, at indicated flow rate, ft/day | | | | |
|---|---|---|---|---|---|---|---|
| | Oil | Water | 2–4 | 14–16 | 25–27 | 26–38 | 50–60 |
| Indiana limestone | | | | | | | |
| No. 4 | Nujol-soltrol | Wasson inj. | 0.31 | 0.51 | 0.70 | 0.94 | 1.16 → |
| | | | | 1.05 ← | 1.10 | 1.11 | |
| | Wasson crude | Wasson inj. | 0.91 | 1.33 | 1.67 | — | 2.2 → |
| | | | | (not measured) ← | | | |
| No. 6 | Wasson crude | Wasson inj. | 6.8 | 10.4 | 14.1 | 17.3 | 18.2 → |
| | | | | 15.2 ← | 15.8 | 16.7 | |
| No. 1L | Wasson crude | Wasson inj. | 1.18 | 2.1 | 2.7 | 3.4 | 4.0 → |
| | | | 2.6 ← | 2.9 | 3.6 | 3.6 | |
| Wasson 1A | Wasson crude | Wasson inj. | 1.23 | 1.76 | 2.4 | 2.9 | 3.6 → |
| | | | | 3.6 ← | 3.7 | 3.6 | |

Initial waterfloods conducted at 2–4 ft/day. Water injection rates were then increased incrementally to obtain values shown.
Arrows indicate direction of rate changes.
For increase in rates from 2–4 ft/day to 50–60 ft/day, $\Delta S_{or} \cong 2-4\%$.

TABLE 4

RESULTS OF FLOW TESTS ON THE EFFECTIVENESS OF VARIOUS WATER SOLUTIONS SATURATED WITH ISOBUTYL ALCOHOL IN INCREASING $k_w$ AT $S_{or}$

Indiana limestone No. 4    k = 17.6 md    $\phi$ = 17.5%    t = 105°F

| Fluid systems | | | Permeability and saturation data | | | | | | | | | |
|---|---|---|---|---|---|---|---|---|---|---|---|---|
| | | | Waterflood tests | | | | | Injectivity improvement tests | | | | |
| Oil | Water | Injection | $k_o$ at $S_{or}$, md | $k_w$ at $S_{or}$, md (2–4 ft/day) | $S_{or}$, % $V_p$ | $k_w$ at $S_{or}$, md (50–60 ft/day) | $S_{or}$, % $V_p$ | $S_{orc}$, % $V_p$ (50–60 ft/day) | $k_{ROH}$, md | $k'_w$, md | $k'_w/k_w$ (perm. improv. ratio) | $k/k_w$ (potential) | $(k'_w/k) \times 100$ (% effectiveness) |
| Nujol-soltrol | Wasson inj. | ROH | 8.5 | 0.31 | 30 | 1.16 | 27 | ~5 | 12.1 | 7.3 | 24–6.3 | 57–15.2 | 41 |
| | Wasson inj. | W+ROH | 8.8 | 0.32 | 30 | 1.16 | 27 | 18 | 3.1 | 3.6 | 11.3–3.1 | 55–15.2 | 20 |
| | 2% | W+ROH | 7.9 | 0.27 | 30 | 1.24 | 27 | 10–15 | 3.3 | 4.7 | 17.4–3.8 | 65–14.2 | 27 |
| | 5% | W+ROH | 7.5 | 0.29 | 30 | 1.26 | 27 | 10–15 | 3.4(4.6)* | (5.9) | — | 61–14.0 | (34) |
| | 10% | W+ROH | 8.7 | 0.34 | 30 | 1.62 | 27 | 10–15 | 3.5 | 4.9 | 14.4–3.0 | 52–10.9 | 28 |
| Wasson crude | Wasson inj. | ROH | 12.1 | 0.97 | 25 | 3.2 | 23 | 10 | 10.6 | 6.6 | 6.8–2.1 | 18.1–5.5 | 38 |
| | Wasson inj. | W+ROH | 12.0 | 0.91 | 25 | 2.2 | 23 | 19 | 3.3 | 4.2 | 4.6–1.9 | 19.3–8.0 | 24 |
| | 2% | W+ROH | 12.0 | 0.97 | 25 | 2.9 | 23 | 10–15 | 3.6 | 4.6 | 4.7–1.6 | 18.1–6.1 | 26 |
| | 10% | W+ROH | 13.7 | 0.90 | 25 | 4.0 | 23 | 10–15 | 4.7 | 5.3 | 5.9–1.3 | 19.6–4.4 | 30 |

* Data enclosed by ( ) are based on treatment rate of 150 ft/day.

stone core No. 4 and Wasson core 1A. However, for the other two cores, the observed reduction in $k_w$ as the rate is decreased suggests that part of the change in $k_w$ is due to redistribution of the fluids in the core as well as a change in average oil saturation.

Permeabilities to alcohol-water and alcohol alone, $k'_{roh}$, and water permeability following treatment, $k'_w$, are included in Table 2. Increases in $k_w$ achieved with the treatment were determined by comparing $k'_w$ with the water-flood $k_w$ values ($k'_w/k_w$, permeability improvement ratio in Table 2). We see that alcohol alone increases the "low rate" $k_w$ values by factors ranging from about 7 to 25; the alcohol-water systems achieves factors of about 3–17. Lesser increases in $k_w$ result from the "high rate" waterflood.

As shown earlier, the solubility of isobutyl alcohol in water decreases with increasing salinity. We would anticipate that these differences in solubility should be reflected in performance during treatment as well as in overall effectiveness. To measure such effects, we conducted flow tests with the different alcohol-water solutions listed in Table 4. Experimentally, we used the water that formed the alcohol-water system for waterflooding the test core prior to treatment and for displacing the alcohol system after treatment. Changeover of waters was made at $S_{orc}$.

Based on pressure response, the flow tests showed that mobilization of oil occurred most rapidly with the alcohol-Wasson injection water - the water in which the alcohol is most soluble. Response was almost immediate with the Wasson water; whereas the other waters showed lags of 0.25 to 0.50 pore volume, the largest delay being observed for the 10 percent NaCl solution. However, pressure changes during the floods indicated that the amount of oil mobilized was less for the fresh water than for the more saline solutions. The pressure traces for the 2 percent, 5 percent and 10 percent NaCl solutions are essentially superimposable when corrections are made for difference in response time and fluid viscosities. The alcohol-Wasson injection waterflood was completed after about 1 to 1.5 pore volumes of injection whereas the other floods required about 3-5 pore volumes. The delay in response is related to the extraction of alcohol by the oil as the treating fluid enters the core. Larger volumes of water are required for the waters having a reduced alcohol solubility. The pressure data behavior supports the $S_{orc}$ values reported in Table 4. The reduction in oil saturation for the higher salinity water systems is larger than for the fresher water.

The results of flow tests using alcohol-water solutions in which salinity was varied, presented in Table 4, indicate that the effectiveness of a treatment increases with salinity of the water phase. This effect is more pronounced with the Nasson crude oil than with the oil mixture. For both oils, the Wasson injection water system was less effective than the higher salinity fluids. The alcohol-water mixtures were at least 50-75 percent as effective as the alcohol alone. Included in the table primarily to show trends in $k'_{roh}$ values is a test with alcohol-5 percent NaCl as the treating agent in which the rate during the treatment was increased from 50-60 ft/day to over 150 ft/day. The additional increase in permeability was accompanied by the production of traces of oil.

One of the difficulties in judging the value of a treatment for increasing $k_w$ by reducing $S_{or}$ is the uncertainty of the water permeability in the formation. Laboratory tests on the effect of flow rate on waterflood $S_{or}$ and $k_w$ show that variations in $k_w$ of threefold can occur by increasing the rate from 2-4 ft/day to 50-60 ft/day, a range of rates of interest for injectivity in the formation. Our tests show that isobutyl alcohol-water systems can displace enough oil to increase $k_w$ at $S_{or}$ by factors of about 3-17 when compared to a "low rate" waterflood $k_w$. Similarly, increases varying by factors of about 1.3 to 3.8 are calculated using "high rate" reference data.

What is claimed is:

1. A well treating process for improving the effective permeability to water by injecting an oil displacing fluid to displace residual oil away from a well comprising:
   injecting a substantially surfactant-free aqueous saline solution containing from about 6 to 20 percent by volume of a normally liquid alcohol having a solubility in said aqueous solution of about 6 to 20 percent by volume; and
   injecting said aqueous solution at a rate providing a frontal advance of from about 50 to 60 feet per day along a radial direction away from the point of injection.

2. The process of claim 1 in which the aqueous solution of alcohol is displaced by a substantially alcohol-free aqueous liquid that is injected at substantially the same rate as the aqueous solution of alcohol.

3. The process of claim 1 in which the aqueous solution in which the alcohol is dissolved contains at least about 1 percent by weight dissolved salt.

4. The process of claim 1 in which said alcohol is an aliphatic monohydric alcohol that contains from about 3 to 6 carbon atoms.

5. The process of claim 1 in which said alcohol is isobutyl alcohol.

6. The process of claim 1 in which said alcohol is isopropyl alcohol.

* * * * *